March 27, 1934.  R. P. LINK  1,953,020
AUTOMATIC MAGAZINE GRAMOPHONE
Filed Oct. 5, 1931   7 Sheets-Sheet 1

INVENTOR
Rolls P. Link
BY
ATTORNEY

March 27, 1934.  R. P. LINK  1,953,020
AUTOMATIC MAGAZINE GRAMOPHONE
Filed Oct. 5, 1931  7 Sheets-Sheet 2
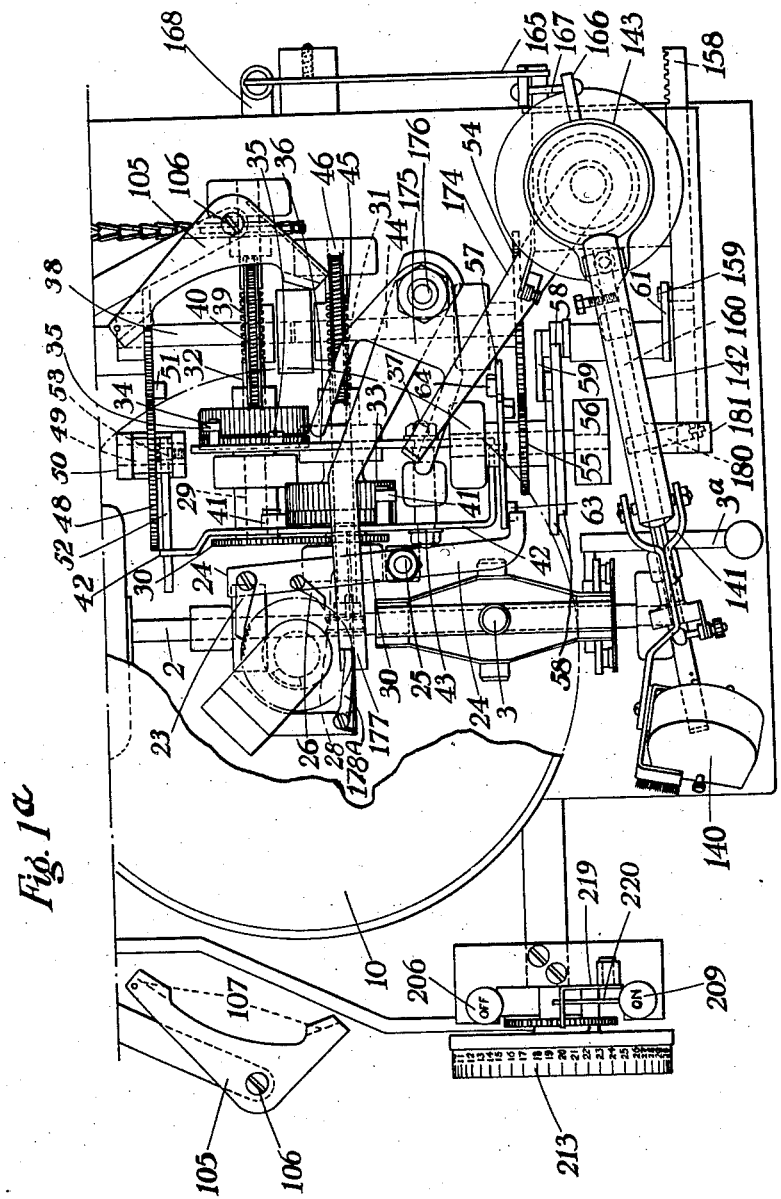
Fig. 1α
INVENTOR
Rolls P. Link
BY 
ATTORNEY March 27, 1934.    R. P. LINK    1,953,020
AUTOMATIC MAGAZINE GRAMOPHONE
Filed Oct. 5, 1931    7 Sheets-Sheet 3

INVENTOR
Rolls P. Link
BY
ATTORNEY

March 27, 1934.  R. P. LINK  1,953,020
AUTOMATIC MAGAZINE GRAMOPHONE
Filed Oct. 5, 1931  7 Sheets-Sheet 4

INVENTOR
Rolls P. Link
BY
ATTORNEY

March 27, 1934.  R. P. LINK  1,953,020
AUTOMATIC MAGAZINE GRAMOPHONE
Filed Oct. 5, 1931  7 Sheets-Sheet 5

INVENTOR
Rolls P. Link
BY
ATTORNEY

March 27, 1934.　　　R. P. LINK　　　1,953,020

AUTOMATIC MAGAZINE GRAMOPHONE

Filed Oct. 5, 1931　　　7 Sheets-Sheet 6

INVENTOR
Rolls P. Link
ATTORNEY

March 27, 1934.    R. P. LINK    1,953,020
AUTOMATIC MAGAZINE GRAMOPHONE
Filed Oct. 5, 1931    7 Sheets-Sheet 7
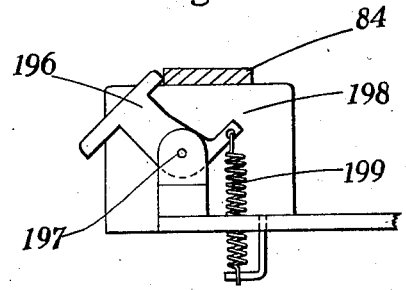
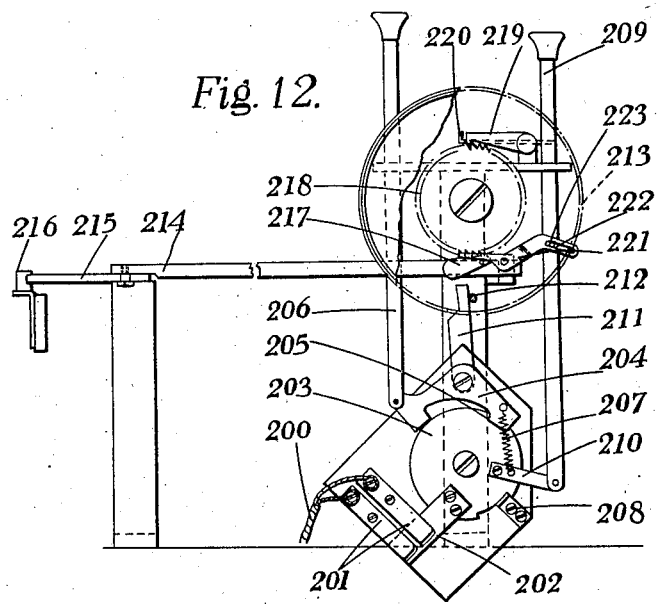
INVENTOR
Rolls P. Link
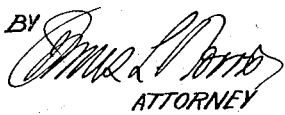
ATTORNEY Patented Mar. 27, 1934

1,953,020

UNITED STATES PATENT OFFICE 1,953,020

AUTOMATIC MAGAZINE GRAMOPHONE

Rolls Percival Link, Hackney, London, England

Application October 5, 1931, Serial No. 567,040
In Great Britain October 15, 1930

16 Claims. (Cl. 274—10)

This invention relates to improvements in mechanism of the kind associated with gramophone instruments for the purpose of mechanically changing the records and for removing the sound box needle from and replacing it in the record groove.

The improved mechanism provides means for removing a record from a pile of records and placing the same in position on the record table, the transferring device releasing the record, and for bringing the needle of the sound box or an electrical pick-up into position in the record groove so that the sound recorded on the record disc can be reproduced by the rotation of the table. On the arrival of the needle at the inner end of the groove the sound box and tone arm are removed to a position beyond the edge of the disc and the transferring device is brought into operation to raise the disc from the record table, to reverse the disc and to replace it on the table so that the sounds recorded by the grooves on opposite sides of the same disc can be reproduced in succession. Thereafter the transferring device comes into operation to remove the disc from the record table and deposit it on a receiving table, and the transferring device then moves back to the supply table or pile of records to transfer a fresh record, the cycle of operations being repeated indefinitely. Thus the only attention required in order to ensure the playing of a large number of records is the need for keeping the feed table supplied with fresh records as the pile on the feed table becomes exhausted.

The arrangements for bringing the sound box needle into engagement with the record groove allow record discs of different diameters to be placed on the table and the transferring device is adapted without readjustment to such records.

The sound box or electrical pick-up before being brought into contact with a record disc occupies a position in which the needle is raised out of the plane of the upper face of the disc. As the sound box is moved radially towards the edge of the disc a spur on the sound box mounting encounters the edge of the disc and rotates the said mounting so that the sound box and needle carried thereby is permitted to be lowered on to the record. As the blank border around the part of a record disc having the record groove formed therein is of a variable width on different discs, a small brush or row of bristles or flexible pad is arranged near to and in advance of the needle whereby, in case the needle fails at once to enter the groove, the sound box is drawn along by the groove acting on this brush or pad.

Means are also provided for carrying the sound box arm outwardly to allow the record disc to be reversed or removed and a fresh disc substituted therefor.

In the accompanying drawings:

Figures 1 and 1ª, read together, are a plan view of a machine constructed in accordance with this invention.

Figure 2:
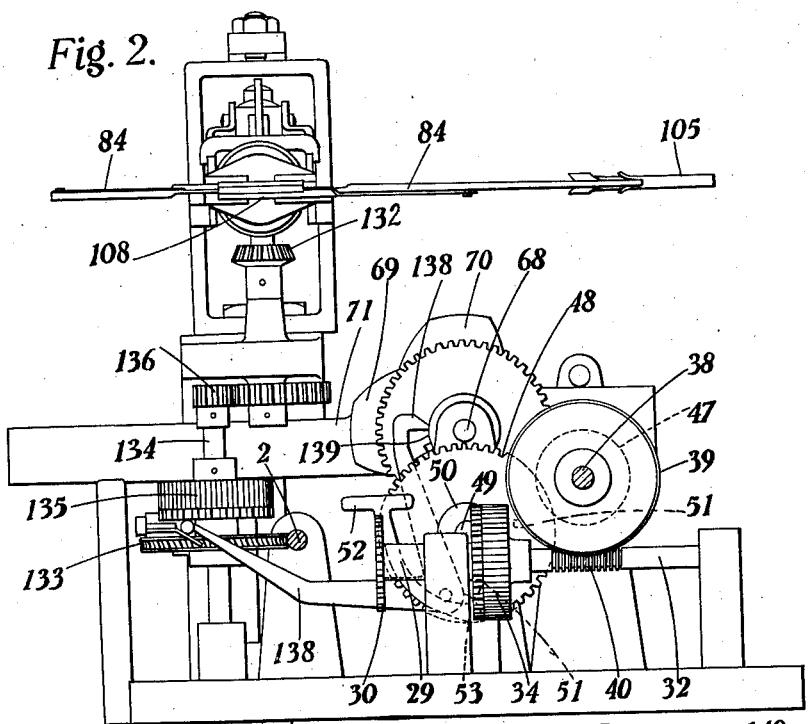
Figure 2 is an end view of mechanism for effecting the movement of gripper arms comprised in the record disc transfer device.
Figure 4:
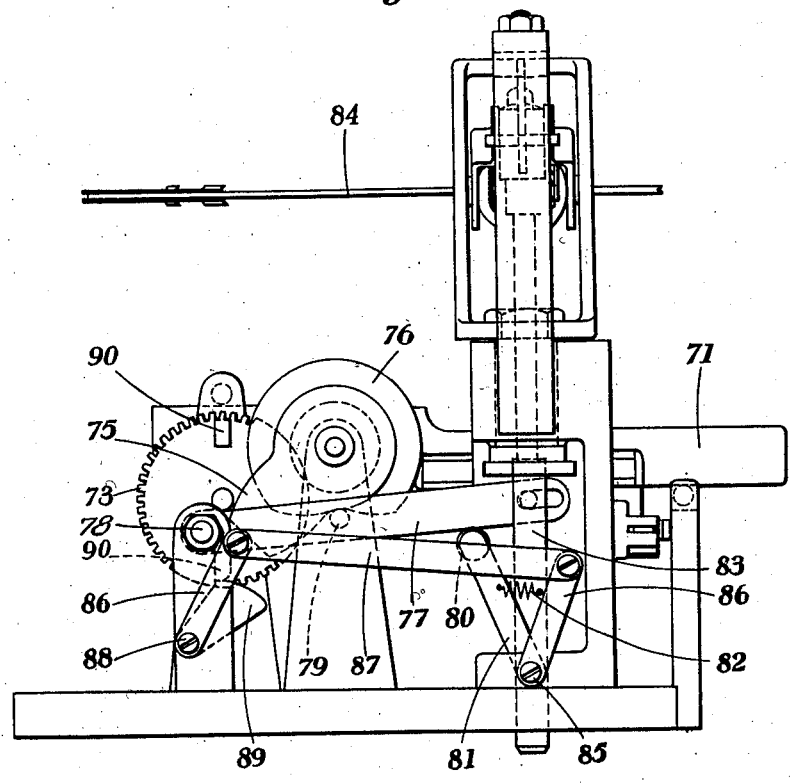

Figure 4 a rear view of parts shown in Figure 2.

Figure 5:
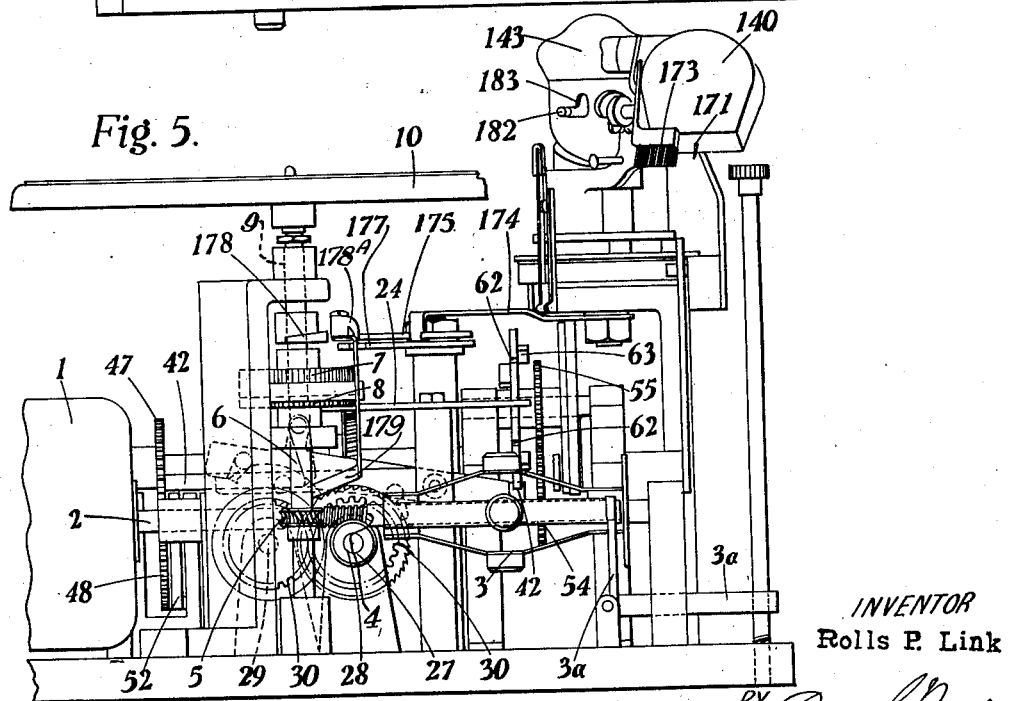
Figure 6:
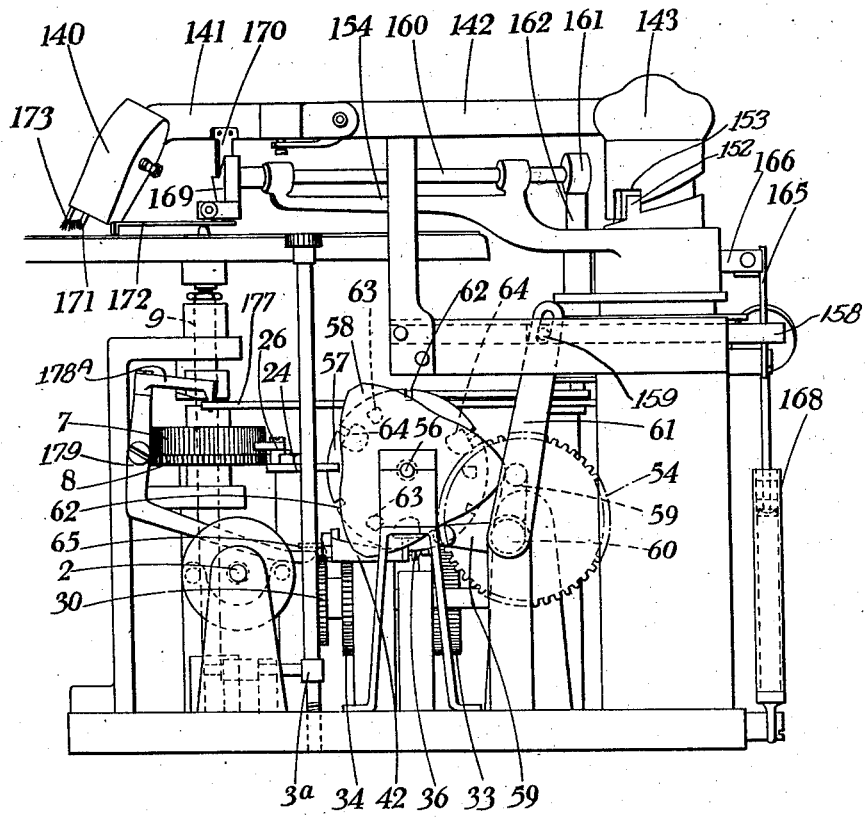

Figures 5 and 6 are views, in elevation, of mechanism for effecting the movement of the tone arm or pick-up.

Figure 7:
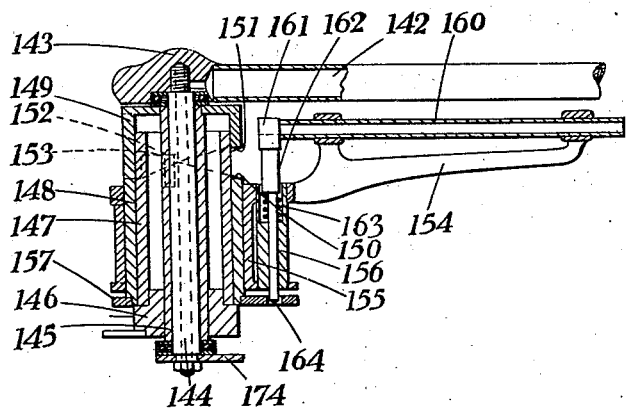

Figure 7 is a detail sectional view of parts shown in Figures 5 and 6.

Figure 8:
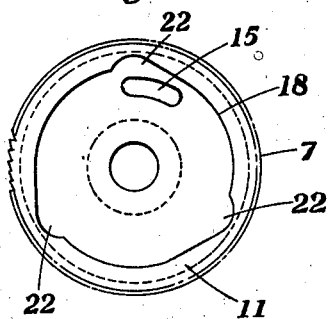
Figure 9:
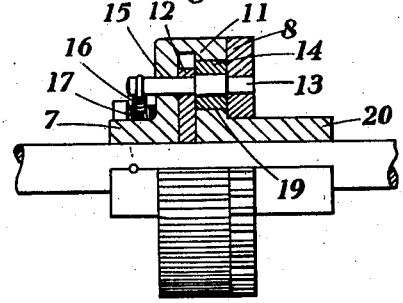

Figures 8 and 9 are detail views of a clutch device.

Figure 10:
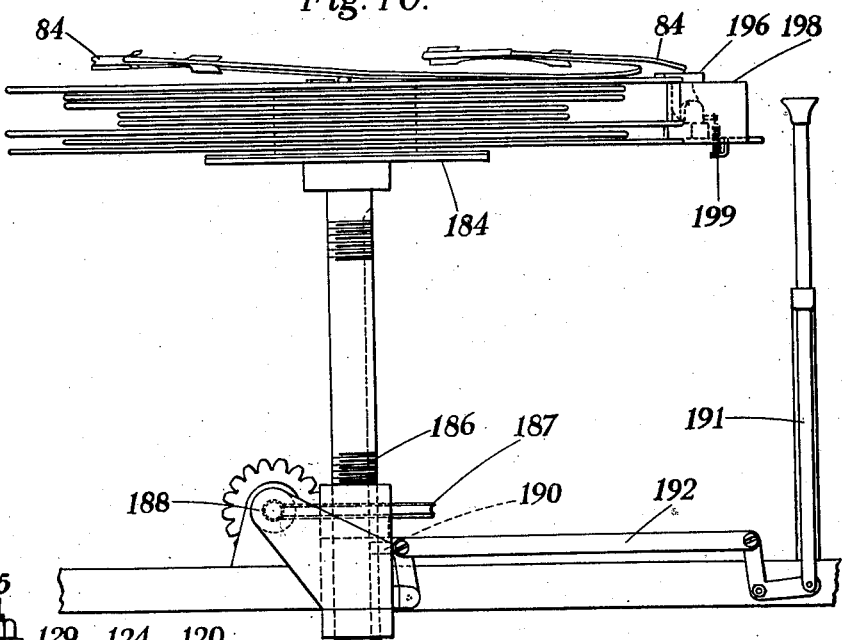

Figure 10 is a view in elevation of the record supply table.

Figure 11 is a detail view of parts shown in Figure 10.

Figure 12 illustrates means for automatically showing the operation of the improved gramophone mechanism.

The machine as shown is actuated by a single motor indicated at 1 which drives a main shaft 2 carrying a governor 3 and a worm 4 (Figure 5) in gear with a worm wheel 5 fast on a shaft 6 connected by a clutch comprising members 7, 8 to a shaft 9 supporting a turntable 10 on which record discs are to be placed. A convenient construction of clutch is shown in Figures 8 and 9. The speed of the governor can be regulated by a device 3a of a usual type.

The driven member 7 of this clutch is formed with a flange 11 having an inner wall of the shape shown in Figure 8. A roller cage 12 carries one or more roller pins 13 each having a roller 14 mounted thereon. One of the said pins extends through a slot 15 in the clutch member 7 and a spring 16 between the pin 13 and a screw 17 on the clutch member 7 tends to hold the pin at one end of the slot, the corresponding roller 14 then being in contact with the inner wall of the flange at a part thereof 18 which is eccentric to the centre line of the clutch. Each roller 14 is then wedged between the flange 11 and the periphery of a cylindrical surface 19 of a driving member 20, and thus forms a driving connection between the two parts of the clutch. The roller pins 13 extend into a plate 8 and this plate and the exterior wall of the flange 11 have teeth formed thereon.

By stopping the rotation of the plate 8 while the driven member is still advancing, the roller pins 13 will be detained so that a recess 22 in the inner wall of the flange will be brought opposite to each roller, and a driving effort will no longer be transmitted to the driven member, the rollers being then rotated idly in contact with the cylindrical part 19 of the driving member. The plate 8 may be stopped by a pawl 23 (Figure 1) on a lever 24 pivotally supported at 25 on a frame part, and a second pawl 26 provided to stop a return movement of the driven member 7 after the recesses have been brought opposite the rollers so that the spring 16 remains stressed as long as the pawls remain thus in engagement with the teeth on the plate 8 and on the driven member 7. When the lever 24 is moved so as to carry both pawls 23, 26 away from the plate 8 and the driven member 7, these parts are free to rotate, and the spring returns the rollers 14 into contact with the parts 18 of the driven member and the latter will thereupon rotate with the driving member. Whilst the clutch is in operation, the pawls 23 and 26 can be held in suitable positions on the lever by friction or by means of springs (not shown) ready to engage the teeth of the plate 8 and driven member 7, as soon as the lever is moved to disengage the clutch member.

Referring to Figure 5 it will be seen that the worm 4 also drives a worm wheel 27 on a shaft 28 geared to a shaft 29 by gear wheels 30. The shafts 28 and 29 are thus rotated continuously whilst the motor 1 is running and at reduced speed on account of the gear ratio between the worm 4 and worm wheel 27. The shafts 28 and 29 are respectively coupled to shafts 31, 32 (Figure 1) by clutches 33, 34. The clutch 34 can be thrown out of gear by pawls 35 on a lever 36 pivoted at 37, and when this clutch is in gear the shaft 32 drives a shaft 38 through a worm 39 and worm wheel 40. The clutch 33 can be thrown out of gear by pawls 41 on a lever 42 pivoted at 43, and when this clutch is in gear the shaft 31 drives a shaft 44 through a worm 45 and worm wheel 46. The shafts 44 and 38 although shown in alignment are free to rotate independently.

On the shaft 38 is a gear wheel 47 in gear with a gear wheel 48 on a spindle 49 mounted in bearings 50. The gear wheel 48 is rotated at half the speed of the shaft 38 and carries tappets 51 acting on a striker 52 pivoted at 53. The clutch lever 42 extends above this striker and when the latter is released the lever is moved to withdraw the pawls 41 so that the clutch 33 becomes operative and drives the shaft 44.

The shaft 44 has a gear wheel 54 thereon in gear with a gear wheel 55 on a shaft 56 carrying a timing disc 57 and complementary cams 58, 58 acting through arms 59 to oscillate a rock shaft 60 carrying an arm 61.

One end of the lever 42 is adapted to engage in turn one of a number of notches 62 in the edge of the timing disc 57 and when the lever 42 is moved to allow the clutch 33 to become operative to rotate the shaft 44 the timing disc 57 is released and permits the arm 61 to be rocked through the gears 54, 55, the shaft 56 and cams 58. This effects movement of a pick-up or tone arm as hereinafter described. Tappets 63 on the timing disc 57 in the rotation of the latter are brought in turn into contact with the lever 24 to release the clutch 7, 8 and allow the record table 10 to be set in rotation. The timing disc also carries tappets 64 which act in turn to depress one end of the lever 36 and raise the pawls 35 thus allowing the clutch 34 to come into operation. After the timing disc has rotated through an angular distance corresponding to the spacing between two consecutive notches 62, the lever 42 enters one of the notches and thereby the clutch 33 is put out of operation. The rotation of the timing disc is thus stopped with one of the tappets holding the lever 36 depressed at this end and the pawls 35 at the opposite end raised to allow the clutch 34 to continue to operate to transmit rotation to the shaft 38 until the striker 52 is again raised by one of the tappets 51 or, as hereinafter described, by a part associated with the record table spindle acting on a lug 65 (Figure 6) projecting from the said lever 42 whereupon the timing disc is again set in rotation. Thus, so long as the motor 1 is in operation, there is a continuous cycle of operation. Starting for example with the lever 42 in a notch in the timing plate 57 and the lever 36 engaged by a tappet 64, the clutch 34 is in operation rotating the shaft 38 so that a tappet 51 on the gear wheel 48 will be brought into contact with the striker 52 which will cause the clutch 33 to come into operation. The timing plate 57 will then be rotated and a tappet 64 will be moved to release the lever 36 so that the clutch 34 will be rendered inoperative until the next tappet 64 comes into contact with the lever 36 so that by movement of this lever the clutch 34 becomes operative and shortly afterwards the lever 42 enters a notch in the disc and the clutch 33 becomes inoperative and the shaft 44 stops while the shaft 38 continues to rotate. The shaft 38, when in rotation acts through a pair of gear wheels 66, 67 to drive a shaft 68 carrying a pair of complementary cams 69, 70 which transmit an intermittent reciprocatory movement to a bar 71 carrying a toothed rack 72. The shaft 68 rotates at half the speed of the shaft 38 which also acts through gear wheels 73, 74 to drive a cam 75 sleeved on the shaft 68 at twice the speed of the said shaft 38. The shaft 68 has fast thereon a cam 76 so that the cam 75 rotates four times as fast as the cam 76. A pair of arms 77 pivoted at 78 to a frame part support a pin or roller 79 (Figure 4) which extends between them and is held in contact with both cams 75, 76 by a roller 80 on an arm 81 and a spring 82 in tension attached at one end to a convenient part of the frame. The movements of the arms 77 are transmitted to a plunger 83 for imparting the required movements to gripper arms 84 by which a record disc can be grasped and moved as hereinafter described. The weight of the arms unloaded or loaded with a record disc tends to raise the plunger 83. The arm 81 is connected through its rock shaft 85 to arms 86 connected by a link 87, the rock shaft 88 of one arm 86 having an arm 89 fast thereon in the path of two tappets 90 on the gear wheel 73.

Figure 3:
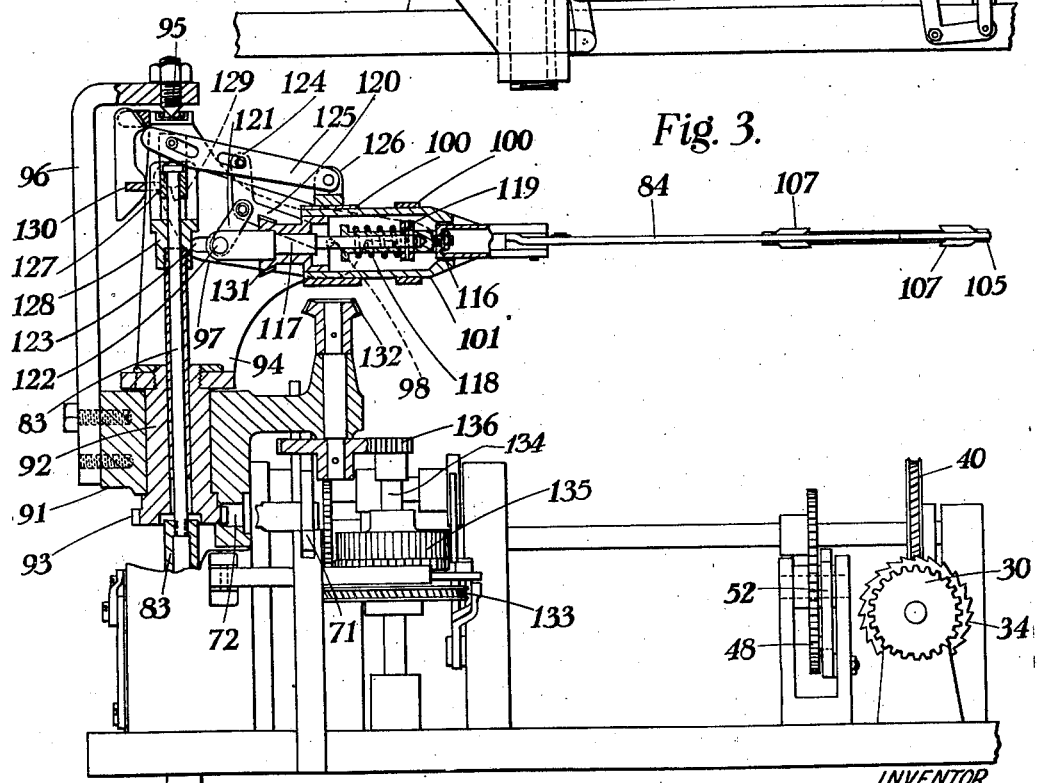
Figure 3 is a side view, with parts in section.

A frame part 91 (Figure 3) rotatably supports a sleeve 92 provided with a gear wheel 93 in engagement with the rack 72 and the said sleeve carries a frame 94 which is supported at its upper end by a centre pin 95 held in a bracket 96. The frame 94 supports side plates 97 carried on pivots 98, and by means of these pivots 98 and pins 99 supports bearing rings 100 in which a barrel 101 can rotate, this barrel having lugs 102 for supporting pivot pins 103 on which the gripper arms 84 are mounted. Fingers 105 are pivotally mounted on the outer ends of the arms 84 and may be held in position on the arms frictionally, or by springs (not shown) allowing a small rocking movement of the fingers on their pivots 106, or otherwise allowed a small freedom of movement. The fingers 105 are formed with grooves 107 in which the edge of a record disc can be held. A third support 108 for a record disc held in the finger 105 is provided by a block 108, with a groove 110, supported by links 111 pivoted to the arms 84 at 113. As the arms 84 close together to cause the fingers to engage a record disc the block 108 is brought nearer to a line passing through the pivots 106. Record discs of various sizes can be held by the fingers and block by moving the arms to bring the fingers to the required distance apart.

The inner ends of the arms 84 are connected by a pin 114 to a drawer slide 115. An extension 116 (Figure 3) of the drawer slide has a drawer rod 117 mounted therein with a spring 118 between a collar on the extension 116 and a collar attached to the rod 117 by a cross pin 119.

A link 120 mounted on the pivot pin 98 is connected to a link 121 which carries a pin 122 movable in a slot 123 and passing through the drawer rod 117. A part of the link 120 carries a pin 124 movable in a slot in a lever 125 mounted in a lug 126 on the bearing ring 100. The lever 125 has a pin and slot connection with a head 127 mounted on the upper end of the plunger 83 so that it can turn thereon. When the plunger 83 is drawn down by the arms 77, the links 120, 121 act through the rod 117 and spring 118 to close the arms 84 on a record disc. After the fingers 105 have closed on the edge of a record disc further movement of the draw rod 117 is permitted by the spring 118 to allow the fingers to grasp and hold record discs of different sizes.

A head 128 is connected to the side plates 97 by pins 129 and a latch 130 prevents downward movement of the side plates when the head 127 is pulled down by the plunger 83, acted upon by the cam 76, through a short distance to close the gripper arms 84. When however the plunger is drawn down by the cam 75 the end of the lever 125 releases the latch so that on the head 127 coming into contact with the head 128 draws down the side plates about the pivots 98. A bevel wheel 131 carried by the barrel 101 is thus brought into engagement with a bevel wheel 132, which has previously been set in rotation as hereinafter described, and the barrel is rotated to invert a record disc held in the gripper arms 84.

An extension of the motor shaft 2 is formed with a worm in engagement with a worm wheel 133 (Figure 2) which drives a shaft 134 through a clutch 135, and the shaft 134 is connected through gear wheels 136 to the shaft of the bevel wheel 132. The clutch 135 is rendered operative by a clutch lever 138 and a cam 139 on the shaft 68.

A sound box or electric pick-up 140 is carried on a fork 141 pivotally connected to an arm 142 (Figure 7) extending from a rotary head 143 carried on a spindle 144 (Figure 7) mounted in a sleeve or bushing 145 slidably mounted in a frame part 146. A sleeve 147 mounted on the frame part 146 supports coaxial sleeves 148, 149 with helical ends 150, 151 in contact, relative movement of these parts being limited by a projection 152 provided on the sleeve 148 and lodged in a recess 153 in the sleeve 149. A carrier arm 154 extends from a collar 155 rotatable on the sleeve 148 and carrying a tube 156. An incomplete gear wheel 157 or circular rack fixed on the sleeve is rotated by a rack 158 which is connected to the arm 61 by a pin or lug 159. The arm 154 supports a spindle 160 which can rock through a small angle and carries a cam 161 to act on a locking plunger 162 carried in the tube 156 to depress the plunger against the thrust of a spring 163 into engagement with a hole 164 in a lug projecting from the incomplete gear wheel 157. Whilst the plunger is engaged in the hole, the arm 154 and gear wheel 157 move together but by a rotary movement of the cam 161 the arm 154 is released from the wheel and is free to be moved by a weighted arm 165 connected to a spur 166 on the collar 155 by a link 167 the movement of the arm 165 being controlled by a dash pot 168.

The sound box or pick-up arm 142 is at times supported on a crutch 169 by a strut 170 and while the arm is moving towards the table the needle 171 of the sound box is above the level of a record disc on the turn table. A lug 172 extending from the crutch, on engaging the edge of a record disc on the table tilts the crutch so that the strut is released from the crutch and the needle is in a position to be lowered on to the record disc. To ensure that the needle enters the record groove a brush 173 is provided carried on the sound box or pick-up adjacent to the needle to bring the needle into the groove and thereafter the sound box is advanced in the usual manner across the record by the rotation of the table. The tilting of the crutch rotates the cam 161 so that the locking plunger 162 is withdrawn from the hole 164 and allows the carrier arm 154 to be returned by the weighted arm 165.

During rotation of the table the pick-up arm carries with it an arm 174 fixed on the spindle 144 and thereby moves a fork 175 on a spindle 176 gradually. An arm 177 frictionally engaged on the spindle 176 brings a swinging arm 178A into contact with the periphery of a cam 178 (Figure 5) on the table spindle 9. The periphery of the cam 178 pushes back the arm 177, through the swinging lever 178A, so long as the movement of the arm towards the spindle is gradual. When the pick-up arm makes a sudden or relatively large movement, as occurs when the needle passes from the record groove into a circuit silent or run out groove, as usually provided on gramophone discs, the arm 177 moves the swinging arm 178A carried on a clutch lever 179 to a position above a helical radial surface of the cam which then moves the clutch lever 179 so that one end thereof moves the lug or projection 65 and clutch lever 42, thereby putting the clutch 33 into operation.

This returns the pick-up or sound box arm on to the carrier arm by means of the rack 158, by rotation of the cams 58 and consequent movement of the arm 61. As the strut 170 is returned on to the crutch 169 moving away from the table 10 by the rack 158 the cam 161 is rotated to press the plunger 162 into the hole 164, which has been brought into alignment therewith, by an arm 180 on the spindle 160 coming into contact with an abutment 181.

It should be noted that in the movement of the arm 142 away from the centre of the table 10 a movement of the sleeve 148 relatively to the sleeve 149 takes place thus first lifting the head 143 and arm, this movement being ensured by a pin 182 on the stationary sleeve 147 extending into a slot 183 in the sleeve 149 which allows the latter to be lifted. The projection 152 then comes into contact with a wall of the recess 153 and the sleeves 148, 149 rotate together, the pin 182 passing into the horizontal part of the slot 183.

When the movement of the arm 61 is reversed the pin at first prevents the head and arm from descending and the helical face of the sleeve 148 moves out of contact with the corresponding face of the sleeve 149 whilst the sleeve is supported by the pin 182 until the vertical part of the slot 183, is above the pin and the arm 142 can move down so that the needle will be lowered to the plane of the record groove when the strut is moved out of the crutch.

At the same time the arm 174 is carried across the fork 175 and the arm 177 being retained by the swinging arm 178 at the end of the clutch lever 179 this arm is returned to a position relatively to the fork in which these parts are ready to repeat the movements hereinabove described.

The arms 84 are operated to take a record disc from a pile of record discs of different diameters in an indiscriminate order carried on a feed table 184 and after the arms have placed a record disc on the table 10 with opposite sides thereof uppermost successively, the disc is removed to a delivery table 185. These tables are maintained at a suitable height in accordance with the number of discs piled thereon, as shown in Figure 10, by means of a screw 186 engaging a worm wheel 187 serving also as a nut and rotated by a worm 188 driven by chain gearing 189 from the shaft 32. Rotation of the screw 186 is prevented by a bolt 190 engaged in a slot in the screw. When the bolt 190 is withdrawn by means of a push rod 191 and links 192, the table can be rotated by hand whilst the worm wheel 187 is not rotating and the table can be thus raised or lowered to the required position.

Alternatively, the tables may be raised and lowered, as shown in connection with the delivery table 185, by a cam operated rod 193 acting through a pawl and gearing 194, a push rod 195 being provided to impart a reverse drive to the raising and lowering gear.

In order to avoid injury to the discs on the feed table, the swinging movement of the arms 84 about the centre to bring the fingers to opposite sides of the centre line through the feed table is effected before the said arms are lowered into the plane of the uppermost disc and before the arms are fully opened. The arms come to rest on bearers 196 carried on pivots 197 mounted in positioning blocks 198 and supported by springs 199 in the position shown in Figure 10 with the upper surfaces of the bearers horizontal. The arms are then opened to their fullest extent by the operation of the arms 77 thrusting the plunger 83 upwardly, and the said arms 84 pass outside the bearers 196 on to the positioning blocks. As the arms in this movement close one towards the other, the bearers are rocked as shown in Figure 11 to allow the arms to pass over them.

In Figure 12 a device is shown for starting and stopping the motor 1 which can be set to automatically stop the motor after a predetermined number of records have been transferred from the supply table 184 to the receiving table 185. The supply leads 200 to the motor 1 are connected to terminals 201 which can be closed by a switch arm 202 carried on a rotary disc 203. A latch plate 204 engages in a notch 205 in the disc 203 to retain the switch arm 202 in position closing the circuit, as shown. The latch plate 204 can be rocked by a push rod 206 to release the said plate from the notch and then a spring 207 extending between the plate and the disc draws the arm 202 away from the terminals until stopped by an abutment 208 limiting the movement of the disc. The circuit can be closed by pressing down a push rod 209 connected to an arm 210 on the disc 203 so as to rotate the said disc until the latch plate 204, drawn by the spring 207 is again engaged in the notch 205, the switch arm then being held in contact with the terminals. The latch plate 204 may be rocked to open the switch by an arm 211 in the path of a pin 212 on a rotary disc 213. The disc 213 can be rotated manually to carry the pin through a required angular distance away from the arm and thereafter the pin can be moved step by step towards the arm 211 by a rod 214 reciprocated by a bell crank lever 215 oscillated by a stud 216 on the bar 71 as it is moved to cause the swinging movement of the arms 84. The rod 214 acts on the disc 213 through a spring pressed pawl 217 and ratchet wheel 218 to turn the disc in a clockwise direction. Reverse movement of the disc 213 by the drag of the pawl 217 is prevented by a pivoted pawl 219. When it is desired to set the disc 213, the pawl 219 can be raised by an arm 220 on the push rod 209, and at the same time the pawl 217 can be moved out of engagement with the ratchet wheel 218 by a lever 221 having a slot 222 therein to receive a pin 223 on the push rod. The bell crank lever 215 can be turned out of the path of the stud 216 when the use of this device for stopping the motor automatically is not required.

Figure 1:
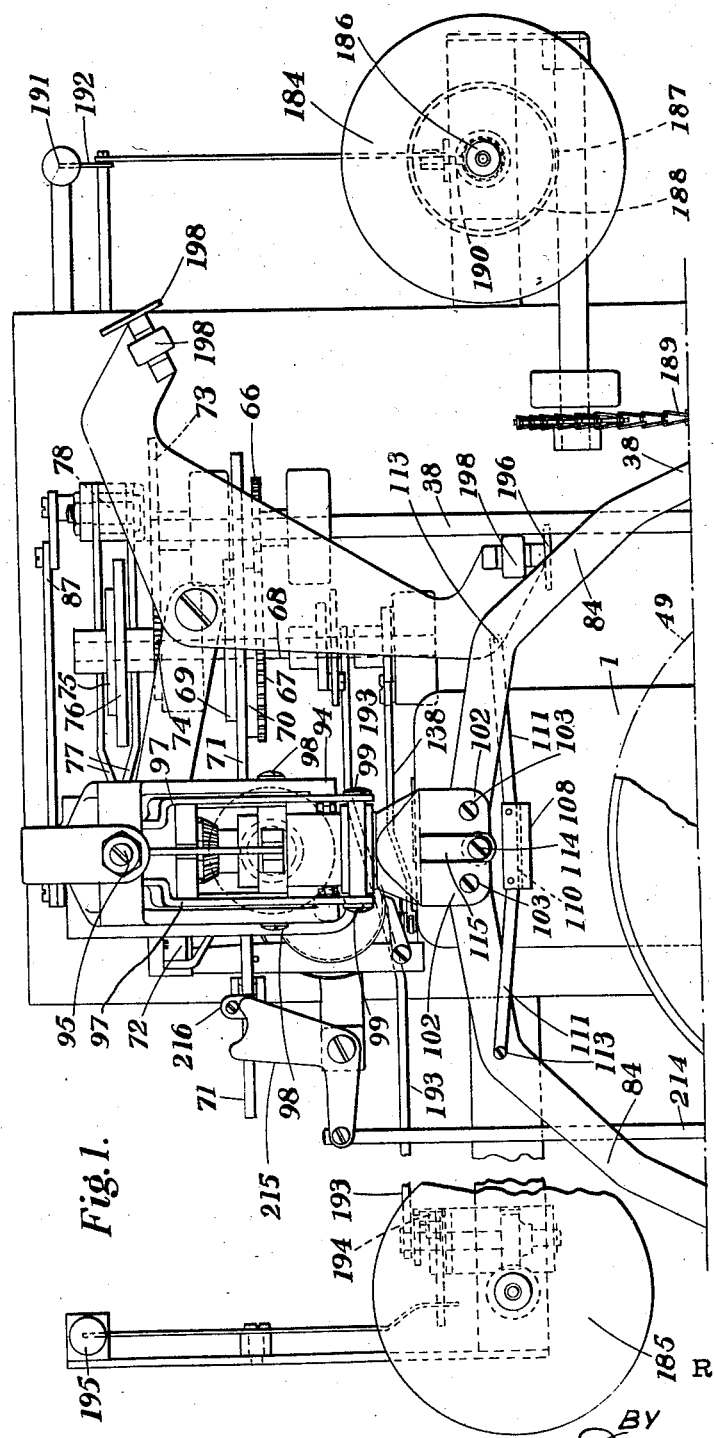

The mechanism hereinabove described is timed to carry out the required movements in the following order. Assuming that the record table 10 is still, that the sound box arm 142 is swung away from the table 10, as shown in Figure 1, and that the gripper arms 84 are symmetrically disposed with reference to the feed table 184 and resting on the bearers 196, as shown in Figure 10, if the motor 1 is started, the clutch 34 being then operative, the shaft 38 will be set in motion. The cam 76 is thereupon brought to a position to permit the roller 79 to rise to the position in which it is shown in Figure 4 whilst a tappet 90 raises the roller 80 and thereby the plunger 83. The final rising movement of the plunger 83, acting through the lever 125 and links 120, 121, opens the gripper arms to their fullest extent and presses them on the positioning blocks 198. As the cam 76 continues to rotate and the tappet 90 passes clear of the arm 89, the plunger 83 is drawn down, first moving the lever 125 and links 120, 121 to move the gripper fingers 105 more closely together to grasp a record supported in position in the path of these fingers by the table 184. In the further downward movement of the plunger 83 the head 127 will come into contact with the head 128 and move the latter downwardly to rock the side plates 97 about the pivots 98, thereby tilting the gripper arms 84 to lift the record which they hold above the plane of the table 10. The cams 69, 70 move the bar 71 so that the rack 72 turns the sleeve 92 to bring the lugs 102 which carry the pivot pins 103 on which the gripper arms are mounted to the position in which they are shown in Figure 1, the gripper arms however being closer together and supporting a record held in the fingers 105, rotational movement of the sleeve 92 through the operation of the cams 69, 70 being stopped as soon as the centre of the record carried by the arms is in line with the centre of the record table. The cam 76 has now rotated through about one complete revolution so that it allows the plunger 83 to be raised by a tappet 90, the tappet wheel 73 rotating at half the speed of the cam 76. This lifting of the plunger causes the gripper arms to open and release the record, leaving it free upon the table 10.

During the period in which the shaft 38 has been rotating to effect transfer of a record from the table 184 to the table 10, the shaft 44 has been at rest, and the gear wheel 48 has been rotated to bring a tappet 51 into contact with the striker 52 to raise one end of the lever 42, thus putting the clutch 33 into operation to rotate the shafts 44, 56. The movement of the above-mentioned lever 42 carries the end of this lever out of a notch 62 in the timing disc 57 on the shaft 56 and the timing disc is rotated to remove a tappet 64 from above the lever 36 so that the pawls 35 engage the clutch 34 and render it inoperative whilst the clutch 33 remains operative until the next notch in the disc comes opposite to the lever 42 and the clutch 33 is made inoperative, both shafts 38 and 44 then being stopped.

Figure 6 shows the lever 42 in a notch 62 in the timing disc 57, having two tappets 63—64 adjacent thereto, the clutch 33 being inoperative and the lever 36 being held by a tappet 64 so that the clutch 34 is operating just before the lever 42 is moved by the striker 52. When the lever 42 is moved out of this notch the timing disc 57 is rotated until the lever enters the next notch in the disc rotating counter-clockwise. This notch has no adjacent tappets. By this movement of the disc a tappet 63 is brought opposite to the lever 24 and moves the same so that the clutch 7, 8 is made operative and the table shaft 9 is set in rotation and continues to rotate until the time disc is again advanced. Also, as soon as the shaft 44 is set in rotation, the cams 58, acting through the arms 59, move the arm 61 and rack 158 to rotate the sleeve 148 which carries with it the carrier arm 154 until the needle of the sound box 140 is deposited on the record previously placed on the table 10. Continued movement of the sleeve 148 after the needle is in contact with the record is permitted by movement of the sleeve 148 out of contact with the sleeve 149 and by the fact that the recess 153 is larger than the projection 152. It is to be noted that the sound box is not deposited on the record until the crutch 169 has been tilted by movement of the lug 172 into contact with the edge of the record so that records of different sizes can be placed upon the table without the necessity of any adjustment such as, for example, adjustment of the travel of the carrier arm 154. As soon as the sound box rests on the record the arm 154 is returned by the weighted arm 165 to a position of rest against an abutment 181. When the needle 171 and brush 173 are lowered on to the border of the record, engagement of the brush with the grooves of the revolving disc carries the needle into the record groove and then the sound box arm is moved across the record disc by travel of the needle in the groove to reproduce the sounds recorded thereby.

The table 10 continues to rotate until the arm 174, moving with the sound box arm 142, moves the fork 175 and the arm 174 in such a manner that the swinging arm 178A is carried above the cam 178 so that the clutch lever 179 raises the lever 42 and renders the clutch 33 operative. The timing disc 57 is then rotated to move the lug 63 away from the lever 24 which is moved by a spring (not shown) to render the clutch 7, 8 inoperative and allow the table 10 to come to rest. At the same time the cams 58, 59 move the arm 61 so as to lift the sound box arm 142 and return it to its support upon the crutch 169, and a tappet 64 on the timing disc moves the lever 36, so that the clutch 34 operates to set the shaft 38 again in rotation and the clutch 33 is put out of operation by the fall of the lever 42 into a notch 62 adjacent to the tappet 64 which, as above mentioned, has moved the lever 36.

The rotation of the shaft 38 brings the cam 75 into operation and through the arms 77 the plunger 83 makes a long downward movement, first closing the arms 84 to grip the record on the table 10 and thereafter tilting the gripper arms 84 and barrel 101 about the pivot 98 so that the bevel wheel 131 is put into gear with the bevel wheel 132 which is rotated for a period whilst the cam 139 (Figure 2) on the shaft 68 is in contact with the clutch lever 138 to hold the latter in a position which allows the clutch 135 to become operative. The arms 84 and a record held therein are thus inverted. When the cam 75 moves past the roller 79 a tappet 90, acting through the arms 86, raises the plunger and then lowers the gripper arms 84 which open and deposit the record on the table 10.

Continued rotation of the shaft 38 next brings a tappet 51 on the gear wheel 48 into contact with the clutch lever 42 so that the shaft 38 comes to rest and the shaft 44 is set in rotation to bring the sound box on to the record on the table, to set the table in rotation and subsequently effect the return movement of the sound box away from the table as previously described.

When the shaft 38 is again set in rotation the cam 76 effects a downward movement of the plunger 83 so as to move the arms 84 to grip the record on the table, and then to lift the record through a short distance when the head 127 comes into contact with the head 128. The cams 69, 70 now move the rack 72 to rotate the sleeve 92, whereby the disc carried by the gripper arms is brought above the delivery table 185 and deposited thereon by an opening movement of the arms 84 which is effected by the operation of the cam 76. The record thus released by the gripper arms can be allowed to fall or is lowered by a descending movement of the delivery table 185 so as to allow the arms to pass clear above the record as the movement of the rack 72 and sleeve 92 is reversed by the cams 69, 70 to bring the arms 84 in one movement above the feed table 184, the arms being raised on to the bearers 196. Then a fresh cycle of the operations above described commences and these operations are repeated indefinitely so long as the motor continues in operation. Thus a number of records can be transferred in succession from the feed table 184 to the delivery table 185 so long as the feed table is kept loaded.

I claim:

1. An automatic magazine gramophone comprising gripper arms for grasping a record disc resting on a rotary record table, a pivotal support for the said arms, a rod for tilting the said arms to an inclined position relatively to the record table above the latter, a rotary support for the pivotal support whereby the said arms can be moved to and from positions vertically above the said rotary table, means for correlating the movements of the said rod and the said rotary support, and gearing operative to rotate the gripper arms whilst the said arms are thus tilted in order to invert the record disc.

2. An automatic magazine gramophone comprising gripper arms for grasping a record disc resting on a rotary record table, a pivotal support for the said arms, a rod for tilting the said arms to an inclined position relatively to the record table above the latter, gearing operative whilst the arms are thus tilted to rotate the arms in order to invert the record disc, a rotary support for the said pivotal support and means for actuating the said rotary support to carry the gripper arms to and from positions above the table.

3. An automatic magazine gramophone comprising gripper arms for grasping a record disc resting on a rotary record table, a pivotal support for the said arms, a rotary support for the pivotal support whereby the said arms can be moved to and from a position vertically above the said rotary table, a rod for tilting the said arms to an inclined position relatively to the record table above the latter, gearing brought into operative relation to rotate the said arms and thereby invert a disc held in the said arms whilst the arms are tilted, and links operated by the said rod to effect opening and closing movements of the gripper arms.

4. An automatic magazine gramophone comprising gripper arms for grasping a record disc resting on a rotary record table, a pivotal support for the said arms, a rotary support for the pivotal support whereby the said arms can be moved to and from a position above the said rotary table, a rod for tilting the said arms to an inclined position relatively to the record table above the latter, gearing brought into operative relation to rotate the said arms whilst they are tilted, a rotary support for the said pivotal support, a toothed rack and gear wheel for imparting movement to the rotary support, an arm for moving the said rod, and cams for operating the toothed rack and the arm in timed relation.

5. An automatic magazine gramophone comprising pivoted gripper arms for grasping a record disc, a support for the pivots of the said arms, means for moving the said support to carry the gripper arms to and from positions above the said table, a rod movable through a predetermined distance by a cam to move the said gripper arms about their pivots, a second cam for moving the rod through a further distance to tilt the gripper arms and support, and gearing brought into engagement by the tilting of the gripper arms to rotate the gripper arms about a diameter of a disc held in the said arms.

6. An automatic magazine gramophone comprising gripper arms, a pivotal support for the said arms, a rotary support for the pivotal support, a supply table, a rod movable to effect opening and closing movements of the arms, gearing for imparting a rotary movement to the said rotary support to carry the gripper arms from the supply table to a rotary table, and from the rotary table to a receiving table, a cam operated arm actuating the said rod to tilt the arms so that the centre of a record disc held by the arms moves above the table on an arc in a plane containing the axes of the rotary support and table, and gearing for rotating the arms whilst thus tilted.

7. An automatic magazine gramophone comprising gripper arms, a pivotal support for each arm, a pivotally mounted rotary support carrying the pivotal supports, a rotary support for the pivotally mounted rotary support, a supply table, a rotary table, a receiving table, gearing for imparting rotary movement to the said rotary support to carry the gripper arms from one table to another in succession, and a rod for opening and closing the gripper arms and for tilting the arms relatively to the rotary table whilst above the latter about the pivotal axis of the pivotally mounted rotary support.

8. An automatic magazine gramophone comprising a rotary table, a sound box, a spindle, an arm carrying the sound box, means for moving the arm rotationally to and from the table about the spindle, means for raising and lowering the said arm longitudinally of the spindle, and a carrier arm for supporting the sound box arm movable coaxially therewith.

9. An automatic magazine gramophone comprising a rotary table, a sound box, an oscillatory arm carrying the sound box movable to and from above the table laterally, a carrier arm mounted coaxially therewith, and a crutch pivotally mounted on the carrier arm to support the sound box arm as the latter is moved towards the table, the said crutch being tilted to release the sound box arm on coming into contact with the rotary table.

10. An automatic magazine gramophone comprising a rotary table, a sound box, an arm carrying the sound box movable to and from above the table laterally, a carrier arm mounted coaxially therewith, a locking plunger for connecting the said arms for simultaneous movement, a crutch pivotally mounted on the carrier arm, and a cam moving with the crutch to release the locking plunger when the crutch is rocked by coming into contact with the rotary table.

11. An automatic magazine gramophone comprising a rotary table, a sound box arm movable over the said table, an arm moved with the sound box arm through a frictional driving connection, a cam rotating with the rotary table and acting to return the said frictionally driven arm step by step as it is moved towards the cam through short distances, and a clutch lever moved by a face of the cam when the sound box arm and frictionally driven arm are moved together through a larger distance, to render operative a clutch which acts to put into operation mechanism for carrying the sound box arm away from the rotary table.

12. An automatic magazine gramophone comprising a rotary table, gripper arms, mechanism for actuating said arms to carry a record disc to and from the table, means for rotating the gripper arms to invert a record disc held therein whilst above the table, a sound box arm, mechanism for moving said sound box arm, clutch devices transmitting motion to each of the said mechanisms, a timing disc for alternatively rendering each clutch device operative and inoperative and means controlled by the timing disc for setting the rotary table in rotation.

13. An automatic magazine gramophone comprising a rotary table, gripper arms, mechanism for actuating said arms to carry a record disc to and from the table, a sound box arm, mechanism for moving said sound box arm, clutch devices transmitting motion to each of the said mechanisms, a timing disc operating a clutch for setting the rotary table in rotation, a clutch moved to its operative position by a cam on the rotary table spindle to render the sound box arm actuating mechanism operative and to rotate the timing disc, a clutch member movable to render operative the gripper arm mechanism and tappets actuated thereby to again render operative the sound box arm actuating mechanism.

14. An automatic magazine gramophone comprising a rotary table, gripper arms, mechanism for actuating said arms to carry a record disc to and from the table, means for rotating the gripper arms to invert a record disc held therein whilst above the table, a sound box arm, mechanism for moving said sound box arm, and clutch devices transmitting motion to each of the said mechanisms, each clutch device comprising a driving member with a cylindrical surface, a driven member with roller recesses therein, a cage carrying the rollers and pawls engaging teeth on the driven member and cage to effect a relative movement of the last mentioned members.

15. An automatic magazine gramophone comprising gripper arms, a supply table, a rotary table, means for inverting the gripper arms while in an inclined position relative to the rotary table and above the latter, a receiving table, means for actuating the gripper arms to carry a record disc from one table to another in succession, means for raising the supply table as record discs are taken therefrom and means for lowering the receiving table as discs are placed thereon.

16. An automatic magazine gramophone comprising a rotary table, gripper arms actuated to bring a record disc on to the said table, a rod for tilting said gripper arms, gearing for inverting the gripper arms whilst tilted in a position above the said rotary table, a motor for driving said rotary table through an intermittently operative clutch, and a trip device for breaking the circuit of the motor after the clutch has been rendered inoperative a predetermined number of times.

ROLLS PERCIVAL LINK.